United States Patent [19]

Asoma

[11] Patent Number: 4,505,553
[45] Date of Patent: Mar. 19, 1985

[54] MICROSCOPE OBJECTIVE

[75] Inventor: Yoshito Asoma, Tokyo, Japan

[73] Assignee: Olympus Optical Co., Ltd., Tokyo, Japan

[21] Appl. No.: 517,057

[22] Filed: Jul. 25, 1983

[30] Foreign Application Priority Data

Aug. 11, 1982 [JP] Japan ............................ 57-138576

[51] Int. Cl.$^3$ ..................... G02B 9/62; G02B 21/02
[52] U.S. Cl. ..................................... 350/414; 350/464
[58] Field of Search ............................. 350/414, 464

[56] References Cited

U.S. PATENT DOCUMENTS 4,232,940 11/1980 Nakagawa ..................... 350/414

FOREIGN PATENT DOCUMENTS 56-75614 6/1981 Japan .

Primary Examiner—John K. Corbin
Assistant Examiner—Rebecca D. Gass
Attorney, Agent, or Firm—Cushman, Darby & Cushman

[57] ABSTRACT

A microscope objective with magnification about 100× comprising six lens components wherein the third lens component is a cemented lens component consisting of three lens elements wherein the second lens element is a negative lens having strong power, the microscope objective being arranged that longitudinal chromatic aberration is corrected satisfactorily favorably and NA is larger than 0.9.

7 Claims, 6 Drawing Figures

MICROSCOPE OBJECTIVE

BACKGROUND OF THE INVENTION (a) Field of the Invention

The present invention relates to a dry type objective and, more particularly, to a microscope objective with a large numerical aperture and high magnification.

(b) Description of the Prior Art

For a dry type of objective with magnification about 100×, the larger the numerical aperture (NA) is, the more desirable. Many of this kind of microscope objectives have NA about 0.9. If possible, it is desirable to make NA as large as 0.95. However, when NA is made larger than 0.9, it is difficult to correct aberrations, especially, longitudinal chromatic aberration. This is because the curve of chromatic aberration of spherical aberration becomes very large.

This kind of known microscope objective is disclosed, for example, in Japanese published unexamined patent application No. 75614/81. In case of said objective, however, curvature of field is not corrected satisfactorily and favourable image cannot be obtained up to the marginal portion of the field. Moreover, NA of said objective is 0.9 and this does not fulfill one of objects of the present invention (to make NA larger than 0.9).

SUMMARY OF THE INVENTION

It is, therefore, a primary object of the present invention to provide a microscope objective of which aberrations such as curvature of field are corrected favourably and, at the same time, longitudinal chromatic aberration is corrected favourably, NA is larger than 0.9 and magnification is high.

The microscope objective according to the present invention comprises six lens components wherein the third lens component is arranged as a cemented lens component consisting of three lens elements and the second lens element thereof is arranged as a biconcave lens with strong power in order to prevent the curve of chromatic aberration of spherical aberration from becoming large.

The microscope objective according to the present invention comprises a first, second, third, fourth, fifth and sixth lens components wherein the first lens component is a positive meniscus lens having a concave surface with a small radius of curvature on the object side, the second lens component is a positive meniscus lens arranged to be concave toward the object side, the third lens component is a cemented lens component consisting of three lens elements, i.e., a boconvex lens, biconcave lens and biconvex lens, the fourth lens component has positive refractive power, the fifth lens component has positive refractive power, and the sixth lens component is a cemented doublet consisting of a positive lens and negative lens.

The microscope objective according to the present invention has the above-mentioned lens configuration and, moreover, is arranged to fulfill the conditions (1) through (5) shown below:

(1) $5.0 \leq f_1/f \leq 6.7$ (2) $4.3 \leq -f_{56}/f \leq 6.5$ (3) $2 \leq -f_{3n}/f \leq 3$ (4) $\nu_{10} \leq 31$ (5) $n_9 \geq 1.6$ where, reference symbol $f$ represents the focal length of the lens system as a whole, reference symbol $f_1$ represents the focal length of the first lens component, reference symbol $f_{56}$ represents the total focal length of the fifth and sixth lens components, reference symbol $f_{3n}$ represents the focal length of the biconcave lens constituting the third lens component, reference symbol $\nu_{10}$ represents Abbe's number of the positive lens constituting the sixth lens component, and reference symbol $n_9$ represents the refractive index of the lens element arranged on the image side in the fifth lens component.

Out of the conditions shown in the above, the conditions (1) and (2) are established in order to correct aberrations, especially, spherical aberration, coma and curvature of field.

If the value defined by the condition (1) becomes larger than the upper limit thereof, the refractive action for paraxial rays becomes weak, the converging action becomes weak and, consequently, the incidence heights of paraxial rays on the lenses arranged in the rear part in the lens system become large. As a result, bulging of spherical aberration becomes large. Besides, for offaxial rays, the refractive action for the upper rays and refractive action for the lower rays become unbalanced, and balance of coma becomes unfavourable. If the value defined by the condition (1) becomes smaller than the lower limit thereof, the power of the first lens component becomes too strong. As the first lens component has large influence on correction of curvature of field, Petzval's sum cannot be corrected favourably when the power of the first lens component becomes too strong and, consequently, curvature of field will be undercorrected. That is, if the value defined by the condition (1) becomes smaller than the lower limit thereof, curvature of field becomes unfavourable and it is impossible to obtain favourable image up to the marginal portion of the field.

If, in the condition (2), $-f_{56}/f$ becomes larger than the upper limit, the upper rays will be overcorrected regarding coma. If $-f_{56}/f$ becomes smaller than the lower limit of the condition (2), the upper rays will be undercorrected regarding coma. In either case, balance of coma becomes unfavourable.

The condition (3) defines the refractive power of the negative lens in the third lens component and serves to eliminate the curve of longitudinal chromatic aberration. The lens system according to the present invention is arranged to make chromatic aberration of the lens system as a whole favourable by selecting the refractive power of said negative lens as an adequate value. If $-f_{3n}/f$ becomes smaller than the lower limit of the condition (3), chromatic aberration of said negative lens will be overcorrected. As a result, F-line and g-line in the lens system largely incline toward the plus side regarding the intermediate NA. If $-f_{3n}/f$ becomes larger than the upper limit of the condition (3), chromatic aberration of said negative lens will be undercorrected. Consequently, F-line and g-line in the lens system largely incline toward the minus side regarding the large NA.

The condition (4) is also established in order to correct chromatic aberration. It serves to correct lateral chromatic aberration and, at the same time, it is also related to longitudinal chromatic aberration. If the condition (4) is not fulfilled, both of lateral chromatic aberration and longitudinal chromatic aberration become unfavourable. In that case, lateral chromatic aberration can be corrected by other lenses. However, longitudinal chromatic aberration cannot be corrected as bulging of chromatic aberration as spherical aberration becomes large.

If $n_9$ does not fulfill the condition (5), the refractive power of the negative lens, which is arranged on the image side in the fifth lens component, for the upper rays will be unbalanced with the refractive power of said negative lens for the lower rays, regarding offaxial rays in large NA, and balance of coma of the lens system becomes unfavourable.

DETAILED DESCRIPTION OF THE PREFERRED EMBODIMENTS

Now, preferred embodiments of the microscope objective according to the present invention described so far are shown below.

| Embodiment 1 | | | | |
|---|---|---|---|---|
| $f = 1$, | $\beta = 100X$, | | $WD = 0.338$ | |
| $r_1 = -0.8312$ | | | | |
| | $d_1 = 1.2472$ | $n_1 = 1.618$ | | $\nu_1 = 63.38$ |
| $r_2 = -1.0788$ | | | | |
| | $d_2 = 0.0495$ | | | |
| $r_3 = -4.3047$ | | | | |
| | $d_3 = 1.1463$ | $n_2 = 1.497$ | | $\nu_2 = 81.61$ |
| $r_4 = -2.6031$ | | | | |
| | $d_4 = 0.0588$ | | | |
| $r_5 = 7.6294$ | | | | |
| | $d_5 = 2.1530$ | $n_3 = 1.617$ | | $\nu_3 = 62.79$ |
| $r_6 = -2.9005$ | | | | |
| | $d_6 = 0.8990$ | $n_4 = 1.6445$ | | $\nu_4 = 40.80$ |
| $r_7 = 4.8696$ | | | | |
| | $d_7 = 2.3913$ | $n_5 = 1.43389$ | | $\nu_5 = 95.15$ |
| $r_8 = -4.5466$ | | | | |
| | $d_8 = 0.0588$ | | | |
| $r_9 = 9.7082$ | | | | |
| | $d_9 = 1.4515$ | $n_6 = 1.43389$ | | $\nu_6 = 95.15$ |
| $r_{10} = -10.0795$ | | | | |
| | $d_{10} = 0.0588$ | | | |
| $r_{11} = 5.0830$ | | | | |
| | $d_{11} = 0.5288$ | $n_7 = 1.6134$ | | $\nu_7 = 43.84$ |
| $r_{12} = 2.6595$ | | | | |
| | $d_{12} = 2.7035$ | $n_8 = 1.43389$ | | $\nu_8 = 95.15$ |
| $r_{13} = -2.7662$ | | | | |
| | $d_{13} = 0.4700$ | $n_9 = 1.651$ | | $\nu_9 = 56.15$ |
| $r_{14} = -41.1170$ | | | | |
| | $d_{14} = 1.5622$ | | | |
| $r_{15} = 23.0151$ | | | | |
| | $d_{15} = 1.1751$ | $n_{10} = 1.84666$ | | $\nu_{10} = 23.88$ |
| $r_{16} = -2.0551$ | | | | |
| | $d_{16} = 0.4886$ | $n_{11} = 1.762$ | | $\nu_{11} = 40.70$ |
| $r_{17} = 2.3284$ | | | | |
| $f_1 = 6.3$, | $f_{56} = -5.4$, | | $f_{3n} = -2.7$ | |

| Embodiment 2 | | | | |
|---|---|---|---|---|
| $f = 1$, | $\beta = 100X$, | | $WD = 0.3381$ | |
| $r_1 = -0.8353$ | | | | |
| | $d_1 = 1.2473$ | $n_1 = 1.60311$ | | $\nu_1 = 60.70$ |
| $r_2 = -1.0734$ | | | | |
| | $d_2 = 0.0459$ | | | |
| $r_3 = -4.5203$ | | | | |
| | $d_3 = 1.1507$ | $n_2 = 1.497$ | | $\nu_2 = 81.61$ |
| $r_4 = -2.5702$ | | | | |
| | $d_4 = 0.0588$ | | | |
| $r_5 = 7.6840$ | | | | |
| | $d_5 = 2.1552$ | $n_3 = 1.617$ | | $\nu_3 = 62.79$ |
| $r_6 = -2.9515$ | | | | |
| | $d_6 = 0.8965$ | $n_4 = 1.65412$ | | $\nu_4 = 39.7$ |
| $r_7 = 5.0227$ | | | | |
| | $d_7 = 2.3913$ | $n_5 = 1.43389$ | | $\nu_5 = 95.15$ |
| $r_8 = -4.7338$ | | | | |
| | $d_8 = 0.0588$ | | | |
| $r_9 = 8.7564$ | | | | |
| | $d_9 = 1.4576$ | $n_6 = 1.43389$ | | $\nu_6 = 95.15$ |
| $r_{10} = -8.7579$ | | | | |
| | $d_{10} = 0.0588$ | | | |
| $r_{11} = 5.2938$ | | | | |
| | $d_{11} = 0.5288$ | $n_7 = 1.6134$ | | $\nu_7 = 43.84$ |
| $r_{12} = 2.7783$ | | | | |
| | $d_{12} = 2.7010$ | $n_8 = 1.43389$ | | $\nu_8 = 95.15$ |
| $r_{13} = -2.7780$ | | | | |
| | $d_{13} = 0.4700$ | $n_9 = 1.6968$ | | $\nu_9 = 56.49$ |
| $r_{14} = -44.0658$ | | | | |
| | $d_{14} = 1.5667$ | | | |
| $r_{15} = 19.0479$ | | | | |
| | $d_{15} = 1.1751$ | $n_{10} = 1.84666$ | | $\nu_{10} = 23.88$ |
| $r_{16} = -2.1018$ | | | | |
| | $d_{16} = 0.4837$ | $n_{11} = 1.762$ | | $\nu_{11} = 40.1$ |
| $r_{17} = 2.3622$ | | | | |
| $f_1 = 6.4$ | $f_{56} = -4.6$ | | $f_{3n} = -2.7$ | |

| Embodiment 3 | | | | |
|---|---|---|---|---|
| $f = 1$, | $\beta = 100X$, | | $WD = 0.3286$ | |
| $r_1 = -0.8346$ | | | | |
| | $d_1 = 1.2105$ | $n_1 = 1.60311$ | | $\nu_1 = 60.7$ |
| $r_2 = -1.0586$ | | | | |
| | $d_2 = 0.0411$ | | | |
| $r_3 = -4.4131$ | | | | |
| | $d_3 = 1.2046$ | $n_2 = 1.497$ | | $\nu_2 = 81.61$ |
| $r_4 = -2.3535$ | | | | |
| | $d_4 = 0.0587$ | | | |
| $r_5 = 6.7936$ | | | | |
| | $d_5 = 2.1977$ | $n_3 = 1.617$ | | $\nu_3 = 62.79$ |
| $r_6 = -3.0068$ | | | | |
| | $d_6 = 0.7042$ | $n_4 = 1.6445$ | | $\nu_4 = 40.8$ |
| $r_7 = 4.0010$ | | | | |
| | $d_7 = 2.4354$ | $n_5 = 1.43389$ | | $\nu_5 = 95.15$ |
| $r_8 = -4.0711$ | | | | |
| | $d_8 = 0.0587$ | | | |
| $r_9 = 9.4942$ | | | | |
| | $d_9 = 1.5519$ | $n_6 = 1.497$ | | $\nu_6 = 81.61$ |
| $r_{10} = -4.9619$ | | | | |
| | $d_{10} = 0.5869$ | $n_7 = 1.6935$ | | $\nu_7 = 53.23$ |
| $r_{11} = -10.3999$ | | | | |
| | $d_{11} = 0.0587$ | | | |
| $r_{12} = 6.7604$ | | | | |
| | $d_{12} = 2.6153$ | $n_8 = 1.43389$ | | $\nu_8 = 95.15$ |
| $r_{13} = -2.8496$ | | | | |
| | $d_{13} = 0.4695$ | $n_9 = 1.71852$ | | $\nu_9 = 33.5$ |
| $r_{14} = -117.5136$ | | | | |
| | $d_{14} = 1.1483$ | | | |
| $r_{15} = 16.0934$ | | | | |
| | $d_{15} = 1.0563$ | $n_{10} = 1.84666$ | | $\nu_{10} = 23.88$ |
| $r_{16} = -2.1660$ | | | | |
| | $d_{16} = 0.9809$ | $n_{11} = 1.752$ | | $\nu_{11} = 45$ |
| $r_{17} = 2.3317$ | | | | |
| $f_1 = 6.3$, | $f_{56} = -4.8$, | | $f_{3n} = -2.6$ | |

| Embodiment 4 | | | | |
|---|---|---|---|---|
| $f = 1$, | $\beta = 100X$, | | $WD = 0.2734$ | |
| $r_1 = -0.8641$ | | | | |
| | $d_1 = 1.2691$ | $n_1 = 1.60311$ | | $\nu_1 = 60.7$ |
| $r_2 = -1.0550$ | | | | |
| | $d_2 = 0.0483$ | | | |
| $r_3 = -7.1435$ | | | | |

-continued

Embodiment 4

| | | | |
|---|---|---|---|
| $r_4 = -4.0800$ | $d_3 = 1.3763$ | $n_2 = 1.497$ | $\nu_2 = 81.61$ |
| $r_5 = 5.2616$ | $d_4 = 0.2680$ | | |
| $r_6 = -3.9515$ | $d_5 = 2.1858$ | $n_3 = 1.6583$ | $\nu_3 = 57.33$ |
| $r_7 = 3.2437$ | $d_6 = 0.6552$ | $n_4 = 1.65412$ | $\nu_4 = 39.7$ |
| $r_8 = -5.4721$ | $d_7 = 2.7397$ | $n_5 = 1.43389$ | $\nu_5 = 95.15$ |
| $r_9 = 8.4523$ | $d_8 = 0.0596$ | | |
| $r_{10} = -15.3120$ | $d_9 = 1.1912$ | $n_6 = 1.43389$ | $\nu_6 = 95.15$ |
| $r_{11} = 4.3154$ | $d_{10} = 0.3693$ | | |
| $r_{12} = 2.3749$ | $d_{11} = 0.5837$ | $n_7 = 1.64769$ | $\nu_7 = 33.8$ |
| $r_{13} = -3.0616$ | $d_{12} = 2.8059$ | $n_8 = 1.43389$ | $\nu_8 = 95.15$ |
| $r_{14} = 13.0934$ | $d_{13} = 1.0542$ | $n_9 = 1.6968$ | $\nu_9 = 55.52$ |
| $r_{15} = 12.2943$ | $d_{14} = 0.1489$ | | |
| $r_{16} = -2.2392$ | $d_{15} = 1.3103$ | $n_{10} = 1.74$ | $\nu_{10} = 28.29$ |
| $r_{17} = 2.5562$ | $d_{16} = 2.3374$ | $n_{11} = 1.6485$ | $\nu_{11} = 53.03$ |
| $f_1 = 5.3$, | $f_{56} = -6.1$, | $f_{3n} = -2.6$ | |

In embodiments shown in the above, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

Figure 1:
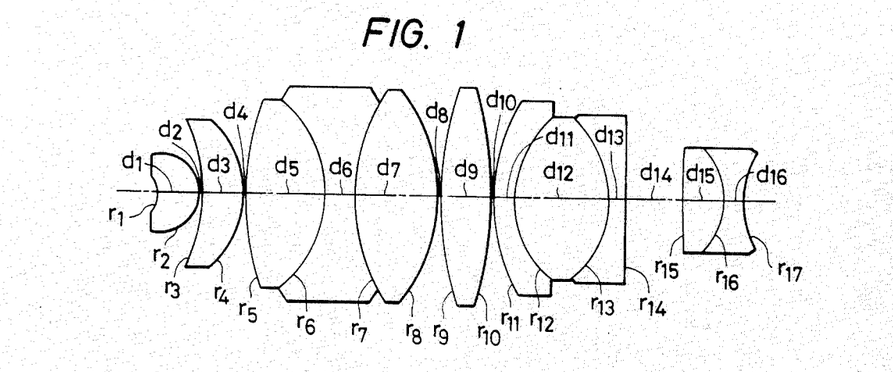
FIG. 1 shows a sectional view of Embodiments 1, 2 and 4 of the microscope objective according to the present invention.

Out of respective embodiments shown in the above, Embodiments 1, 2 and 4 have lens configuration as shown in FIG. 1. That is, the fourth lens component is arranged as a positive single lens, and the fifth lens component is arranged as a cemented lens component consisting of three lens elements, i.e., a negative meniscus lens, biconvex lens and negative lens. Therefore, reference symbols $n_6$ and $\nu_6$ respectively represent the refractive index and Abbe's number of the fourth lens component. Reference symbols $n_7$, $n_8$ and $n_9$ respectively represent refractive indices of the negative meniscus lens, biconvex lens and negative lens constituting the fifth lens component, and reference symbols $\nu_7$, $\nu_8$ and $\nu_9$ respectively represent Abbe's numbers of the negative meniscus lens, biconvex lens and negative lens constituting the fifth lens component.

Figure 2:
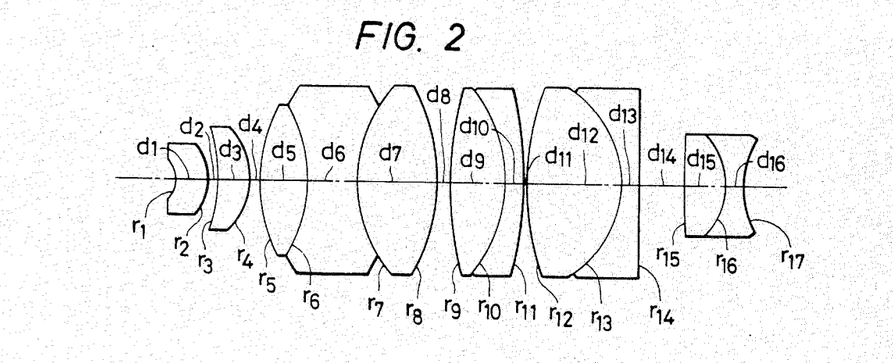
FIG. 2 shows a sectional view of Embodiment 3 of the microscope objective according to the present invention.
Figure 3:
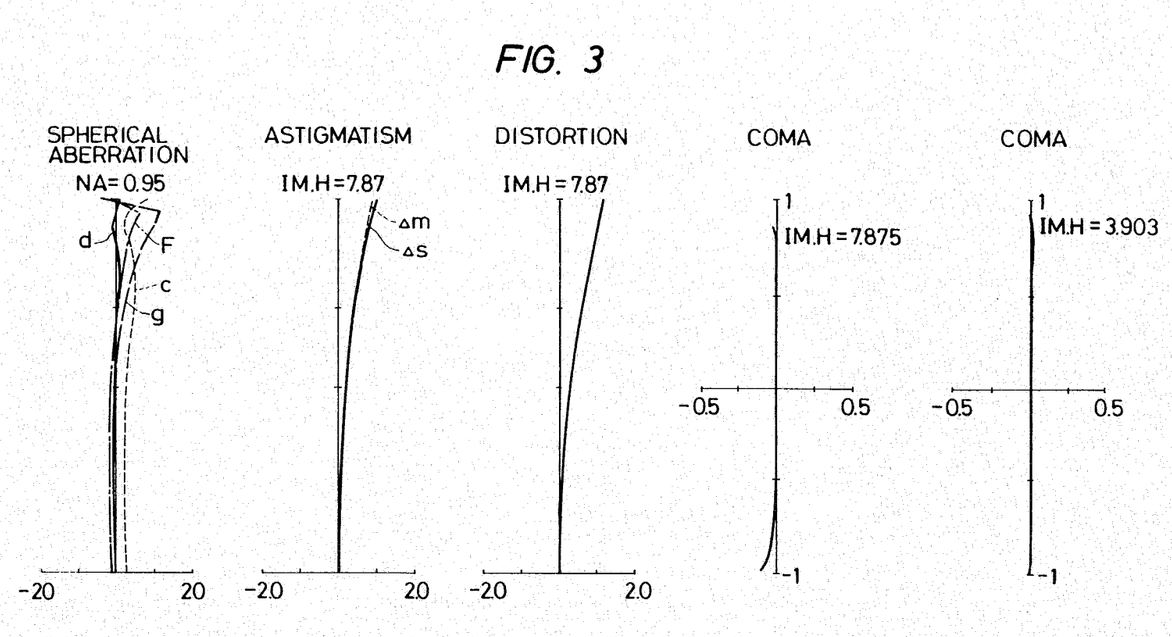
FIGS. 3 through 6 respectively show graphs illustrating aberration curves of Embodiments 1 through 4 of the microscope objective according to the present invention.
Figure 4:
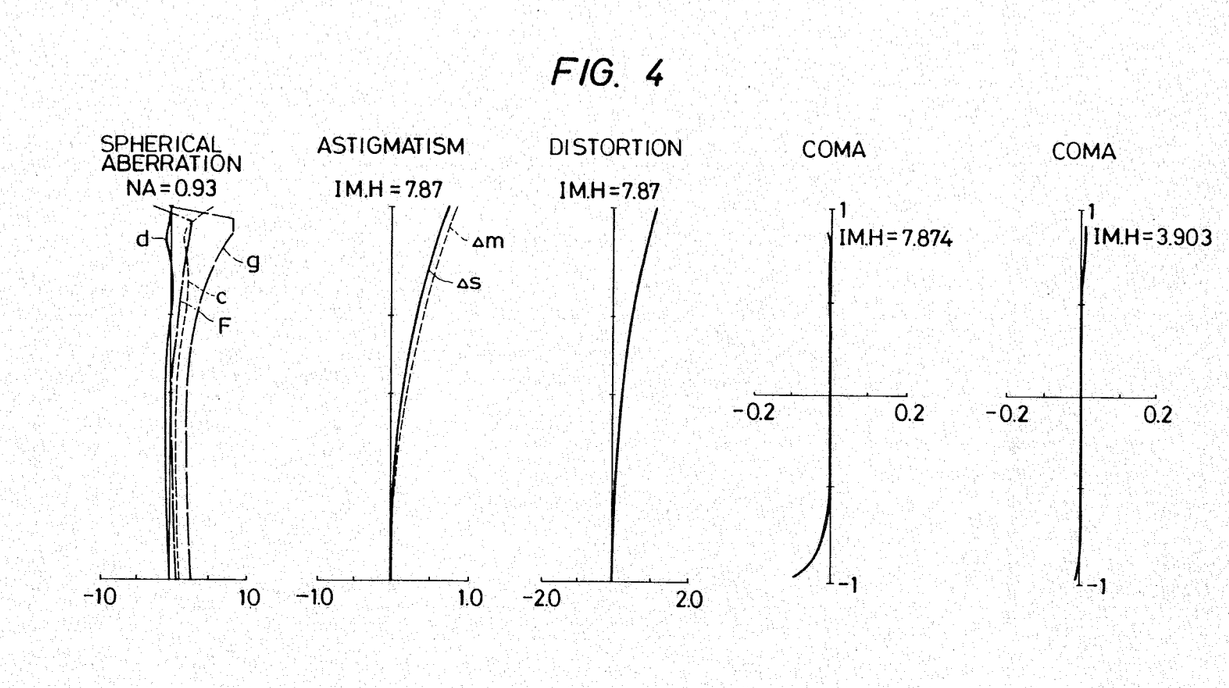
Figure 5:
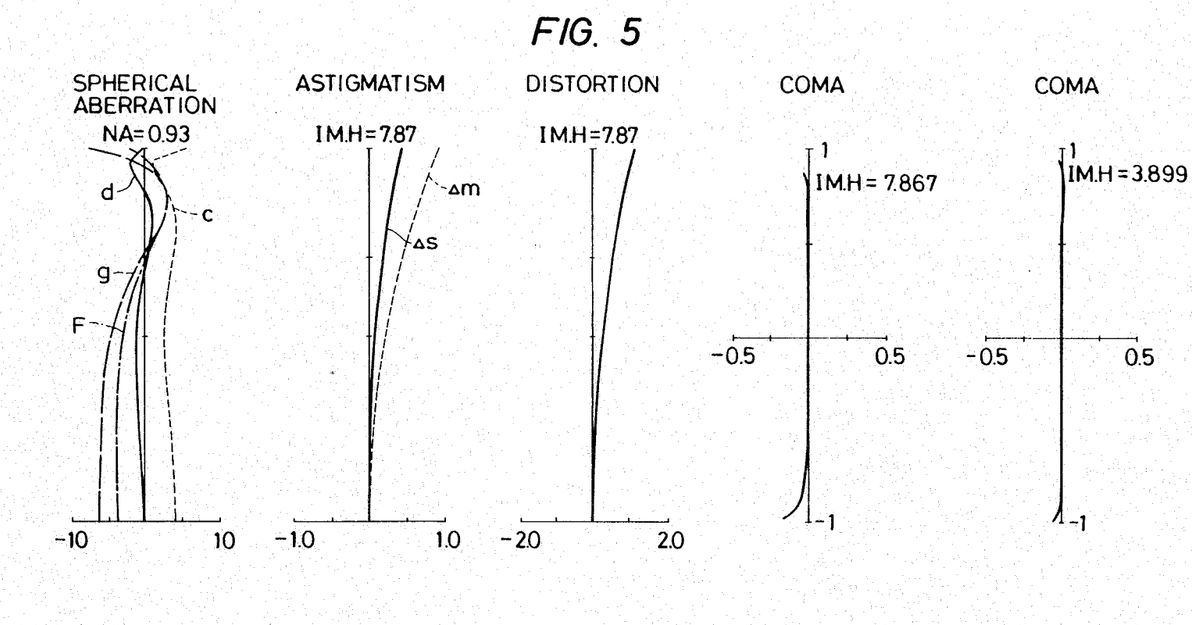
Figure 6:
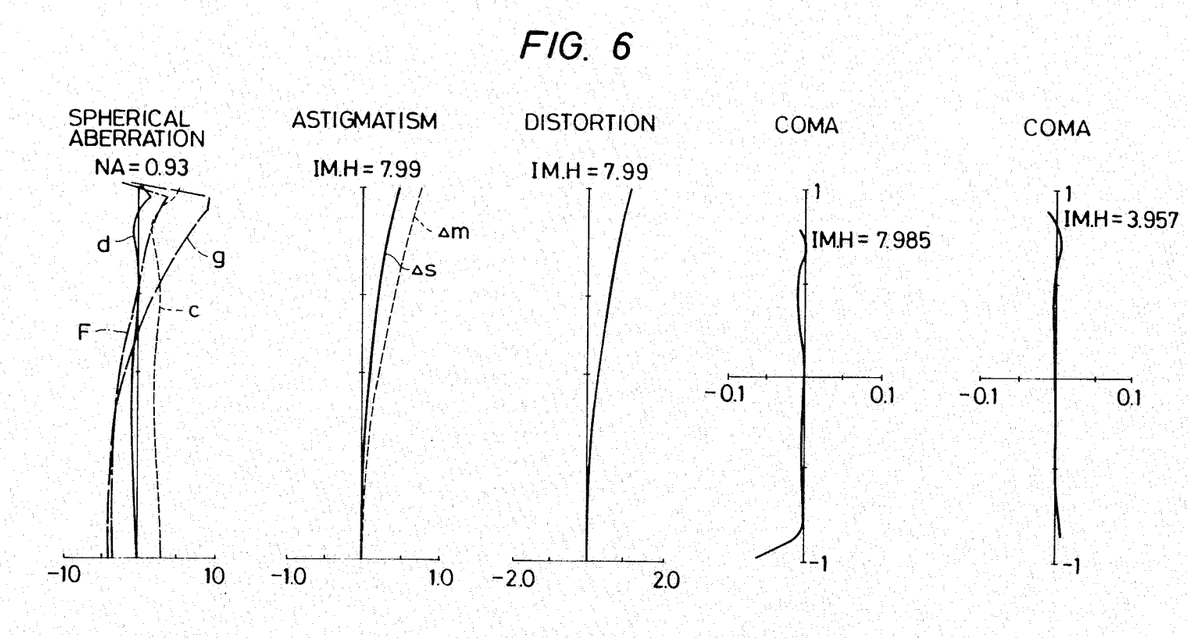

Embodiment 3 has lens configuration as shown in FIG. 2. That is, the fourth lens component is arranged as a cemented doublet consisting of a biconvex lens and negative meniscus lens while the fifth lens component is arranged as a cemented doublet consisting of a biconvex lens and negative lens. Therefore, reference symbols $n_6$, $n_7$, $n_8$ and $n_9$ respectively represent refractive indices of the biconvex lens and negative meniscus lens constituting the fourth lens component and the biconvex lens and negative lens constituting the fifth lens component. In the same way as above, reference symbols $\nu_6$, $\nu_7$, $\nu_8$ and $\nu_9$ respectively represent Abbe's numbers of the biconvex lens and negative meniscus lens constituting the fourth lens component and the biconvex lens and negative lens constituting the fifth lens component.

I claim:

1. A microscope objective comprising a first, second, third, fourth, fifth and sixth lens components wherein said first lens component is a positive meniscus lens having a concave surface with a small radius of curvature on the object side, said second lens component is a positive meniscus lens arranged to be concave toward the object side, said third lens component is a cemented lens component consisting of three lens elements, i.e., a biconvex lens, biconcave lens and biconvex lens, said fourth lens component has positive refractive power, said fifth lens component has positive refractive power, and said sixth lens component is a cemented doublet consisting of a positive lens and negative lens, said microscope objective being arranged to fulfill the conditions (1) through (5) shown below:

(1) $5.0 \leq f_1/f \leq 6.7$
(2) $4.3 \leq -f_{56}/f \leq 6.5$
(3) $2 \leq -f_{3n}/f \leq 3$
(4) $\nu_{10} \leq 31$
(5) $n_9 \geq 1.6$ where, reference symbol $f$ represents the focal length of the lens system as a whole, reference symbol $f_1$ represents the focal length of the first lens component, reference symbol $f_{56}$ represents the total focal length of the fifth and sixth lens components, reference symbol $f_{3n}$ represents the focal length of the biconcave lens constituting the third lens component, reference symbol $\nu_{10}$ represents Abbe's number of the positive lens constituting the sixth lens component, and reference symbol $n_9$ represents the refractive power of the lens element arranged on the image side in the fifth lens component.

2. A microscope objective according to claim 1 wherein said fourth lens component is arranged as a positive single lens, and said fifth lens component is arranged as a cemented lens component consisting of three lens elements, i.e., a negative meniscus lens, biconvex lens and negative lens.

3. A microscope objective according to claim 2, in which said microscope objective has the following numerical data:

| $f = 1$, | $\beta = 100X$, | | WD = 0.338 |
|---|---|---|---|
| $r_1 = -0.8312$ | | | |
| | $d_1 = 1.2472$ | $n_1 = 1.618$ | $\nu_1 = 63.38$ |
| $r_2 = -1.0788$ | | | |
| | $d_2 = 0.0495$ | | |
| $r_3 = -4.3047$ | | | |
| | $d_3 = 1.1463$ | $n_2 = 1.497$ | $\nu_2 = 81.61$ |
| $r_4 = -2.6031$ | | | |
| | $d_4 = 0.0588$ | | |
| $r_5 = 7.6294$ | | | |
| | $d_5 = 2.1530$ | $n_3 = 1.617$ | $\nu_3 = 62.79$ |
| $r_6 = -2.9005$ | | | |
| | $d_6 = 0.8990$ | $n_4 = 1.6445$ | $\nu_4 = 40.80$ |
| $r_7 = 4.8696$ | | | |
| | $d_7 = 2.3913$ | $n_5 = 1.43389$ | $\nu_5 = 95.15$ |
| $r_8 = -4.5466$ | | | |
| | $d_8 = 0.0588$ | | |
| $r_9 = 9.7082$ | | | |
| | $d_9 = 1.4515$ | $n_6 = 1.43389$ | $\nu_6 = 95.15$ |
| $r_{10} = -10.0795$ | | | |
| | $d_{10} = 0.0588$ | | |
| $r_{11} = 5.0830$ | | | |
| | $d_{11} = 0.5288$ | $n_7 = 1.6134$ | $\nu_7 = 43.84$ |
| $r_{12} = 2.6595$ | | | |
| | $d_{12} = 2.7035$ | $n_8 = 1.43389$ | $\nu_8 = 95.15$ |
| $r_{13} = -2.7662$ | | | |
| | $d_{13} = 0.4700$ | $n_9 = 1.651$ | $\nu_9 = 56.15$ |
| $r_{14} = -41.1170$ | | | |
| | $d_{14} = 1.5622$ | | |
| $r_{15} = 23.0151$ | | | |
| | $d_{15} = 1.1751$ | $n_{10} = 1.84666$ | $\nu_{10} = 23.88$ |

-continued

| | | | |
|---|---|---|---|
| $r_{16} = -2.0551$ | | | |
| | $d_{16} = 0.4886$ | $n_{11} = 1.762$ | $\nu_{11} = 40.70$ |
| $r_{17} = 2.3284$ | | | |
| $f_1 = 6.3,$ | $f_{56} = -5.4,$ | $f_{3n} = -2.7$ | | where, reference symbol $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

4. A microscope objective according to claim 2, in which said microscope objective has the following numerical data:

| | | | |
|---|---|---|---|
| $f = 1,$ | $\beta = 100X,$ | $WD = 0.3381$ | |
| $r_1 = -0.8353$ | | | |
| | $d_1 = 1.2473$ | $n_1 = 1.60311$ | $\nu_1 = 60.70$ |
| $r_2 = -1.0734$ | | | |
| | $d_2 = 0.0459$ | | |
| $r_3 = -4.5203$ | | | |
| | $d_3 = 1.1507$ | $n_2 = 1.497$ | $\nu_2 = 81.61$ |
| $r_4 = -2.5702$ | | | |
| | $d_4 = 0.0588$ | | |
| $r_5 = 7.6740$ | | | |
| | $d_5 = 2.1552$ | $n_3 = 1.617$ | $\nu_3 = 62.79$ |
| $r_6 = -2.9515$ | | | |
| | $d_6 = 0.8965$ | $n_4 = 1.65412$ | $\nu_4 = 39.7$ |
| $r_7 = 5.0227$ | | | |
| | $d_7 = 2.3913$ | $n_5 = 1.43389$ | $\nu_5 = 95.15$ |
| $r_8 = -4.7338$ | | | |
| | $d_8 = 0.0588$ | | |
| $r_9 = 8.7564$ | | | |
| | $d_9 = 1.4576$ | $n_6 = 1.43389$ | $\nu_6 = 95.15$ |
| $r_{10} = -8.7579$ | | | |
| | $d_{10} = 0.0588$ | | |
| $r_{11} = 5.2938$ | | | |
| | $d_{11} = 0.5288$ | $n_7 = 1.6134$ | $\nu_7 = 43.84$ |
| $r_{12} = 2.7783$ | | | |
| | $d_{12} = 2.7010$ | $n_8 = 1.43389$ | $\nu_8 = 95.15$ |
| $r_{13} = -2.7780$ | | | |
| | $d_{13} = 0.4700$ | $n_9 = 1.6968$ | $\nu_9 = 56.49$ |
| $r_{14} = -44.0658$ | | | |
| | $d_{14} = 1.5667$ | | |
| $r_{15} = 19.0479$ | | | |
| | $d_{15} = 1.1751$ | $n_{10} = 1.84666$ | $\nu_{10} = 23.88$ |
| $r_{16} = -2.1018$ | | | |
| | $d_{16} = 0.4837$ | $n_{11} = 1.762$ | $\nu_{11} = 40.1$ |
| $r_{17} = 2.3622$ | | | |
| $f_1 = 6.4,$ | $f_{56} = -4.6,$ | $f_{3n} = -2.7$ | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

5. A microscope objective according to claim 2, in which said microscope objective has the following numerical data:

| | | | |
|---|---|---|---|
| $f = 1,$ | $\beta = 100X,$ | $WD = 0.2734$ | |
| $r_1 = -0.8641$ | | | |
| | $d_1 = 1.2691$ | $n_1 = 1.60311$ | $\nu_1 = 60.7$ |
| $r_2 = 1.0550$ | | | |
| | $d_2 = 0.0483$ | | |
| $r_3 = -7.1435$ | | | |
| | $d_3 = 1.3763$ | $n_2 = 1.497$ | $\nu_2 = 81.61$ |
| $r_4 = 4.0800$ | | | |
| | $d_4 = 0.2680$ | | |
| $r_5 = 5.2616$ | | | |
| | $d_5 = 2.1858$ | $n_3 = 1.6583$ | $\nu_3 = 57.33$ |
| $r_6 = -3.9515$ | | | |
| | $d_6 = 0.6552$ | $n_4 = 1.65412$ | $\nu_4 = 39.7$ |
| $r_7 = 3.2437$ | | | |
| | $d_7 = 2.7397$ | $n_5 = 1.43389$ | $\nu_5 = 95.15$ |
| $r_8 = -5.4721$ | | | |
| | $d_8 = 0.0596$ | | |
| $r_9 = 8.4523$ | | | |
| | $d_9 = 1.1912$ | $n_6 = 1.43389$ | $\nu_6 = 95.15$ |
| $r_{10} = -15.3120$ | | | |
| | $d_{10} = 0.3693$ | | |
| $r_{11} = 4.3154$ | | | |
| | $d_{11} = 0.5837$ | $n_7 = 1.64769$ | $\nu_7 = 33.8$ |
| $r_{12} = 2.3749$ | | | |
| | $d_{12} = 2.8059$ | $n_8 = 1.43389$ | $\nu_8 = 95.15$ |
| $r_{13} = -3.0616$ | | | |
| | $d_{13} = 1.0542$ | $n_9 = 1.6968$ | $\nu_9 = 55.52$ |
| $r_{14} = 13.0934$ | | | |
| | $d_{14} = 0.1489$ | | |
| $r_{15} = 12.2943$ | | | |
| | $d_{15} = 1.3103$ | $n_{10} = 1.74$ | $\nu_{10} = 28.29$ |
| $r_{16} = -2.2392$ | | | |
| | $d_{16} = 2.3374$ | $n_{11} = 1.6485$ | $\nu_{11} = 53.03$ |
| $r_{17} = 2.5562$ | | | |
| $f_1 = 5.3,$ | $f_{56} = -6.1,$ | $f_{3n} = -2.6$ | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_{11}$ respectively represent refractive indices of respective lenses, and reference symbol $\nu_1$ through $\nu_{11}$ respectively represent Abbe's number of respective lenses.

6. A microscope objective according to claim 1 wherein said fourth lens component is arranged as a cemented doublet consisting of a positive lens and negative lens, and said fifth lens component is arranged as a cemented doublet consisting of a biconvex lens and negative lens.

7. A microscope objective according to claim 6, in which said microscope objective has the following numerical data:

| | | | |
|---|---|---|---|
| $f = 1,$ | $\beta = 100X,$ | $WD = 0.3286$ | |
| $r_1 = -0.8346$ | | | |
| | $d_1 = 1.2105$ | $n_1 = 1.60311$ | $\nu_1 = 60.7$ |
| $r_2 = -1.0586$ | | | |
| | $d_2 = 0.0411$ | | |
| $r_3 = -4.4131$ | | | |
| | $d_3 = 1.2046$ | $n_2 = 1.497$ | $\nu_2 = 81.61$ |
| $r_4 = -2.3535$ | | | |
| | $d_4 = 0.0587$ | | |
| $r_5 = 6.7936$ | | | |
| | $d_5 = 2.1977$ | $n_3 = 1.617$ | $\nu_3 = 62.79$ |
| $r_6 = -3.0068$ | | | |
| | $d_6 = 0.7042$ | $n_4 = 1.6445$ | $\nu_4 = 40.8$ |
| $r_7 = 4.0010$ | | | |
| | $d_7 = 2.4354$ | $n_5 = 1.43389$ | $\nu_5 = 95.15$ |
| $r_8 = -4.0711$ | | | |
| | $d_8 = 0.0587$ | | |
| $r_9 = 9.4942$ | | | |
| | $d_9 = 1.5519$ | $n_6 = 1.497$ | $\nu_6 = 81.61$ |
| $r_{10} = -4.9619$ | | | |
| | $d_{10} = 0.5869$ | $n_7 = 1.6935$ | $\nu_7 = 53.23$ |
| $r_{11} = -10.3999$ | | | |
| | $d_{11} = 0.0587$ | | |
| $r_{12} = 6.7604$ | | | |
| | $d_{12} = 2.6153$ | $n_8 = 1.43389$ | $\nu_8 = 95.15$ |
| $r_{13} = -2.8496$ | | | |
| | $d_{13} = 0.4695$ | $n_9 = 1.71852$ | $\nu_9 = 33.5$ |
| $r_{14} = -117.5136$ | | | |
| | $d_{14} = 1.1483$ | | |
| $r_{15} = 16.0934$ | | | |

-continued

| | $d_{15} = 1.0563$ | $n_{10} = 1.84666$ | $\nu_{10} = 23.88$ |
|---|---|---|---|
| $r_{16} = -2.1660$ | | | |
| | $d_{16} = 0.9809$ | $n_{11} = 1.752$ | $\nu_{11} = 45$ |
| $r_{17} = 2.3317$ | | | |
| $f_1 = 6.3,$ | $f_{56} = -4.8,$ | $f_{3n} = -2.6$ | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbol $n_1$ through $n_{11}$ respectively represent refractive indices of respective lenses, and reference symbols $\nu_1$ through $\nu_{11}$ respectively represent Abbe's numbers of respective lenses.

* * * * *